US009144023B2

(12) United States Patent
Hebbar et al.

(10) Patent No.: US 9,144,023 B2
(45) Date of Patent: Sep. 22, 2015

(54) METHOD AND SYSTEM FOR SAVING ENERGY IN A MOBILE TERMINAL

(75) Inventors: Abdelkrim Hebbar, Nozay (FR);
Abderrahmane Maaradji, Nozay (FR);
Erick Bizouarn, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 676 days.

(21) Appl. No.: 13/508,445

(22) PCT Filed: Nov. 10, 2010

(86) PCT No.: PCT/FR2010/052415
§ 371 (c)(1),
(2), (4) Date: May 30, 2012

(87) PCT Pub. No.: WO2011/058279
PCT Pub. Date: May 19, 2011

(65) Prior Publication Data
US 2012/0231858 A1 Sep. 13, 2012

(30) Foreign Application Priority Data
Nov. 16, 2009 (FR) ..................................... 09 05503

(51) Int. Cl.
*H04B 1/38* (2015.01)
*H04W 52/02* (2009.01)

(52) U.S. Cl.
CPC ............ *H04W 52/0251* (2013.01); *Y02B 60/50* (2013.01)

(58) Field of Classification Search
CPC ........................................................ H04B 1/38

USPC .......................................... 455/574, 404–408
See application file for complete search history.

(56) References Cited

U.S. PATENT DOCUMENTS

| 5,955,963 | A | * | 9/1999 | Ono ............................. 340/7.35 |
| 6,006,101 | A | | 12/1999 | Sakamoto |
| 6,330,446 | B1 | | 12/2001 | Mori |
| 2002/0127967 | A1 | | 9/2002 | Najafi |
| 2004/0042417 | A1 | | 3/2004 | Kennedy |
| 2008/0240006 | A1 | * | 10/2008 | Tseng et al. .................. 370/310 |
| 2008/0285494 | A1 | | 11/2008 | Shin |

FOREIGN PATENT DOCUMENTS

| CN | 101345989 A | 1/2009 |
| JP | H0983427 | 3/1997 |
| JP | 2008113366 | 5/2008 |
| WO | 0173959 | 10/2001 |
| WO | 0192992 | 12/2001 |
| WO | 0203719 | 1/2002 |

* cited by examiner

*Primary Examiner* — Michael T Vu
(74) *Attorney, Agent, or Firm* — Patti & Malvone Law Group, LLC

(57) ABSTRACT

Method for saving energy in a mobile terminal, this method comprising
A first period, called the mobile terminal in-use period (1), for sending control messages with a first transmission frequency; and
A second period, called the mobile terminal idle period (2), for sending control messages with a second transmission frequency,
The transition from an idle period to an in-use period, or vice versa, is dependent upon the movement of the mobile terminal, and a time-out.

11 Claims, 2 Drawing Sheets

METHOD AND SYSTEM FOR SAVING ENERGY IN A MOBILE TERMINAL

FIELD OF THE INVENTION

The invention relates to rechargeable electric devices wirelessly connected to a communications network, such as mobile communication terminals or similar devices.

BACKGROUND

Here, "mobile terminal" means any portable user device having a time-limited autonomous electrical supply. Mobile telephones, PDAs (Personal Digital Assistants) and so-called smartphones can be cited as non-exhaustive examples of mobile terminals. According to other terminologies, a mobile terminal is also sometimes designated by the expression "mobile station" or "mobile device".

These mobile terminals are typically connected wirelessly to a communications network such as a Public Land Mobile Communications Network (GSM, GPRS, W-CDMA, UMTS, WIMAX or LTE, for example) the GPS network, or a short-range wireless network (Wifi, Wireless LAN, Home RF or ZigBee, for example). To do this, these mobile terminals are equipped with modules for radio interaction (transmission/reception) with the communications network(s) to which they are connected.

In order, for example,
- to be continuously able to receive potential interactions (an incoming call or message for example); or
- to continuously signal their presence (to determine the connecting node, for example), The mobile terminal is able to periodically exchange control messages with nodes, which are typically fixed, on the communications network to which it is connected.

According to certain terminologies, these control messages are called paging. Sending these control messages through the transmission interface on the mobile terminal is iterated over time.

However, this periodic exchange of control messages with the communications network necessarily affects the energy consumption, and consequently, the autonomy of the on-board energy resources (in particular the batteries) in the mobile terminal.

In fact, sending a control message automatically generates energy consumption, which can significantly compromise the length of the mobile terminal's autonomy.

SUMMARY

One purpose of this invention is to optimise the energy autonomy of a mobile terminal.

Another purpose of this invention is to better serve the fast expansion of the mobility of mobile terminals.

Another purpose of this invention is to optimise the sending frequency of control messages by a mobile terminal.

Another purpose of this invention is to make possible the optimal automatic phasing of the control messages sent by a mobile terminal.

Another purpose of this invention is to provide a better compromise between control message transmission efficiency and the cost that this generates in terms of energy resources.

To that end, the invention discloses, according to a first aspect, a method for saving energy in a mobile terminal, this method comprising A first period, called the mobile terminal in-use period, for sending control messages with a first transmission frequency; and A second period, called the mobile terminal idle period, for sending control messages with a second transmission frequency, The transition from an idle period to an in-use period, or vice versa, is dependent upon the movement of the mobile terminal, and a time-out, and the calls received during an idle period are summarised as soon as the mobile terminal switches to an in-use period.

Advantageously,

The transition from an idle period to an in-use period is obtained as soon as movement of the mobile terminal is detected during a predefined time out in an idle period, or after the expiration of the time out; and The transition from an in-use period to an idle period is obtained as soon as the mobile terminal is not in communication and no movement of the mobile terminal is detected during a predefined time-out in the in-use period.

The invention pertains, according to a second aspect, to a mobile terminal comprising A motion sensor making it possible to detect movement of the mobile terminal;

A timer;

A logic unit using the information transmitted from the motion sensor and the time from the timer and making it possible to select, as a consequence, a different control message transmission frequency from that which is currently in use, and to synthesise, upon switching to an in-use period, the calls received on the mobile terminal during an idle period.

According to a third aspect, the invention proposes a computer program product implemented on a memory medium, which may be implemented within an information processing unit, and comprises instructions for incrementing the method summarized above.

DETAILED DESCRIPTION

Hereinafter, we distinguish two types of periods for a mobile terminal, which are:

A mobile terminal in-use period; and

A mobile terminal idle period.

By "idle" we mean here the period during which no mechanical force is applied to the mobile terminal. Typically, the terminal is simply resting on a support (a table, a chest of drawers, the ground, or a night stand, for example).

In particular, given typical usage of a mobile terminal, it can be considered that the lack of mechanical stress from a user on his or her mobile terminal corresponds to an idle period for the mobile terminal. Otherwise, the mobile terminal can be said to be in an in-use period. In other words, if a force is applied to the mobile terminal, provoking its movement or handling, the mobile terminal can be assumed to be in an in-use period. As an example, if the mobile terminal is held, directly or indirectly by a user who is moving, or if the mobile terminal is in use (game, text messaging, or a conversation, for example), then the mobile terminal is considered to be in an in-use period.

Preferably, during a mobile terminal in-use period, the control message transmission frequency is the default frequency specified by the communication protocol in use by the mobile terminal.

During a mobile terminal idle period, the control message transmission frequency is different from that defined by the communication protocol in use by the mobile terminal.

In particular, the control message transmission frequency in a mobile terminal idle period is longer than that defined by the communication protocol in use by the mobile terminal.

In particular, during an idle period, the network interactions of the mobile terminal are limited, or even regularly or completely stopped, so as to best conserve energy.

The fact that the terminal transmits control messages less frequently in idle periods can save on-board energy. This may be, especially, combined with other energy-saving measures (display screen turned off, ring tone deactivated, silent mode activated, or vibrating call identification deactivated, for example).

The result is that the transmission frequency for control messages sent to the communications network to which the mobile terminal is connected will vary between a mobile terminal in-use period and an idle period. In other words, the frequency at which the mobile terminal transmits control messages is dependent upon the movement of the mobile terminal. Mobility and handling of the mobile terminal are taken into account in determining the control message transmission frequency.

Figure 2:
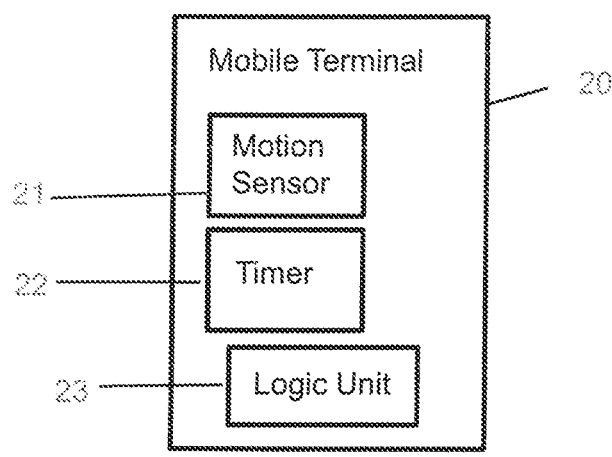
FIG. 2 is a block diagram of a mobile terminal according to the present invention.

As shown in FIG. 2, a mobile terminal 20 must transmit control messages sufficiently often during an in-use period, while transmitting sufficiently few in an idle period.

To do so, mobile terminal 20 is equipped with motion sensor 21, timer 22 and logic unit 23 for processing.

The motion sensor is able to detect movement of the mobile terminal. The motion sensor makes it possible, for example, to detect
- Pressure (touch) being exerted on the mobile terminal;
- Or that the mobile terminal is quite simply moving.

Preferably, the motion sensor is a miniature tri-axial MEMS (Micro-Electro Mechanical Systems) motion sensor. The LIS331DLH tri-axial accelerometer marketed by ST Microelectronics™ is an example of a motion sensor.

The information collected in real time by the motion sensor is matched, using the logic unit, with either a mobile terminal in-use period or an idle period. In fact, the logic unit for processing the information collected by the motion sensor makes it possible to:
- Turn off/on the mobile terminal radio interface;
- Configure the motion sensor: change the sensitivity of the motion sensor; process (reduce, amplify, calibrate, average, for example) the measurements returned by the motion sensor;
- Trigger/stop a timer that makes it possible to date the movement detected by the motion sensor;
- To decide upon the type of period for the mobile terminal (in-use period or idle period), this decision being obtained by comparison, according to the time from the timer, between the measurements (raw or modified) returned by the motion sensor and predefined values that can be modified by the user.

In one embodiment, the logic unit also makes it possible to,
- Notify the communications network, according to the communication protocol in use, of a new control message transmission frequency to be used by the mobile terminal; and
- To modify the control message transmission frequency.

The logic unit may be configured through a graphical user interface adapted to the mobile terminal. This graphical interface contains instructions for:
- Configuring the motion sensor: defining a schedule setting a time sequence for the function of the motion sensor, to specify the number of measurements per hour, for example, to be carried out by the motion sensor;
- Turning off/on the motion sensor;
- Changing the sensitivity of the sensor: for example, defining a minimum threshold at which movement is detected;
- Defining at least one minimum time interval during which no movement by the mobile terminal is detected to switch the mobile terminal from an in-use period to an idle period.
- Specifying an IP (Idle Period) time-out (a duration) for a mobile terminal idle period;
- Specifying an IUP (In-Use Period) time-out (a duration) for a mobile terminal in-use period;
- Setting a time sequence for mobile terminal in-use and idle periods;
- Listing the conditions to be met to switch the mobile terminal from an in-use period to an idle period or vice versa (intensity of movement detected, current timer time, for example);
- Configuring the ringer (vibrator, ring tone, or light signal for example) for calls received during a mobile terminal idle period. These calls, if any, are summarised after any transition of the mobile terminal from an idle period to an in-use period;
- Activating/deactivating the distinction between mobile terminal in-use periods and idle periods.

In one embodiment, the logic unit also makes it possible to,
- Define one or more control message transmission frequencies;
- Query an electronic calendar and to extract, for a pre-recorded event, data including for example correspondences between control message transmission frequencies and the intensity of movement detected for predefined idle periods (meetings, from 10 pm to 8 am every day, for example); and potentially other energy saving measures.

Figure 1:
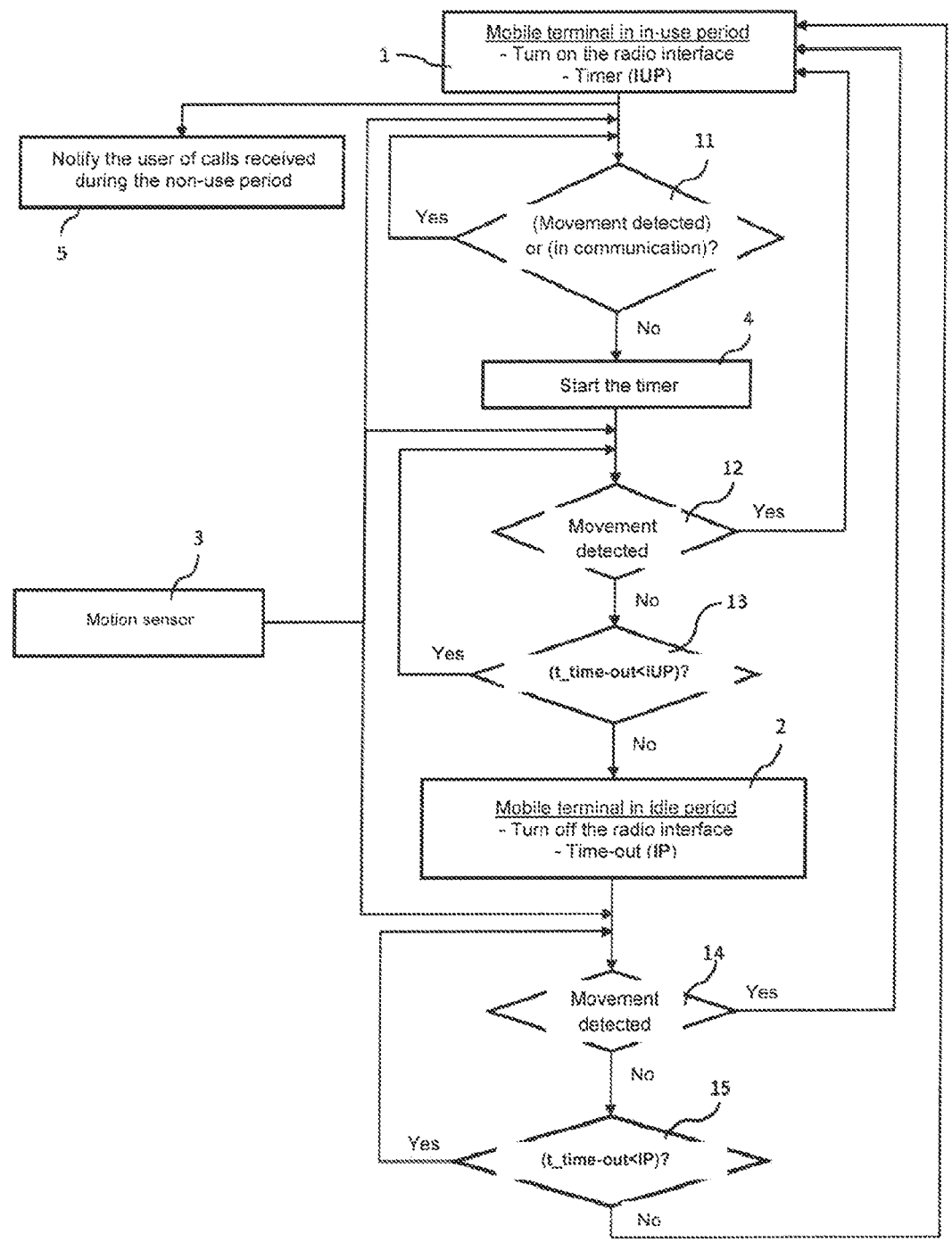
FIG. 1 is an illustration of the transition steps between two mobile terminal operating modes with different energy consumption.

We now refer to FIG. 1, which depicts a procedure to transition from an in-use period to an idle period and vice versa.

If the mobile terminal is in an in-use period 1, that is marked by an active radio interface, then while, according to a first test 11, the mobile terminal is making a call or a movement is detected by the motion sensor 3, then the mobile terminal will stay in an in-use period 1 and the first test 11 remains unmet.

As soon as, according to the first test 11, the motion sensor 3 no longer detects any movement and the mobile terminal is not placing a call, then a timer is set for a predefined IUP duration (step 4 in FIG. 1).

Upon starting the IUP time-out, a second test 12 is activated. As soon as movement is detected, according to this second test 12, the mobile terminal is returned to an in-use period 1. Otherwise if, according to a third test 13, the IUP time-out expires without any movement detected, according to the second test 12, over the entire IUP time-out duration, the mobile terminal will be assumed to be in an idle period 2 during which The radio interface is turned off; and A timer is set for a predefined IP duration.

Given that the mobile terminal is in an idle period 2, as long as, according to a fourth test 14, the motion sensor 3 does not detect any movement and, according to a fifth test 15, the IP time-out has not yet expired, the mobile terminal will remain in an idle period 2.

Tests 11, 12, and 14 may be programmed in the logic unit so that they only decide to detect movement when, for example, The intensity of the movement detected by the motion sensor 3 exceeds a certain threshold;

The intensity of the movement detected by the motion sensor 3 is within two predefined values.

The mobile terminal will remain in an idle period 2 for the length of the IP time-out, in other words, the mobile terminal radio interface will remain off, as long as no movement of the mobile terminal is detected, according to the fourth test 14, for the length of the IP time-out.

If

The time t for the timer reaches, according to the fifth test 15, the end of the IP time-out for the idle period; or Movement of the mobile terminal is detected according to the fourth test 14 then, the mobile terminal will start an in-use period 1 marked by the start of the radio interface. During this period, the terminal returns to its normal operation.

It should be noted that calls received during the mobile terminal idle period 2 that have not yet been received by the user, are summarised by the terminal as soon as it switches to an in-use period 1 (step 5 in FIG. 1).

By "call" we mean a text message (for example an SMS message), an audio message (voice mail for example), an email, or an internal notification generated by the mobile terminal (a planner note for example).

The ringer is restarted as soon as the mobile terminal is in an in-use period 1, which increases the chances, for the user, to be alerted as soon as possible of important messages (SMS, MMS, email, electronic calendar reminders, voice mail, missed call, or notification from the communications network).

Given that the mobile terminal is in an in-use period 1, if, according to the first test 11, the mobile terminal is not making a call and no movement is detected, then the mobile terminal will stay in an in-use period 1, until the time t on the timer reaches the end of the IUP time-out or movement is detected according to the second test 12.

If the time t on the timer reaches the end of the IUP timer for the in-use period 1 without any movement being detected throughout the length of the IUP time-out, then the mobile terminal will start an IP time-out for an idle period 2. The mobile terminal will continue in the idle period 2 as long as no movement is detected for the length of the IP time-out.

In another embodiment, when the mobile terminal is in an idle period 2, a control message transmission frequency lower than that used in the in-use period 1 is selected, without turning off the radio interface. To do so, at the start of an idle period 2, the radio interface notifies the communications network of the change in its control message transmission frequency; then changes its control message transmission frequency.

In one variant, as long as the terminal is in an idle period 2; and no movement is detected, according to the fifth test 15, by the motion sensor 3, the mobile terminal stays in an idle period (radio interface off), even if the time t on the timer has not exceeded the IP time-out for the idle period.

In one variant, the method just described may take into account, in addition to the movement of the mobile terminal, a pre-recorded scheduled sequence for transitioning between in-use periods and idle periods.

Alternatively or in combination, the method just described implements sensors other than the motion sensor (an accelerometer), such as a proximity sensor, or a contact sensor.

It should be noted, in particular, that the control message transmission frequency differs between an idle period in which, preferably, no control messages are transmitted (radio interface off) or very few control messages are transmitted (usage of a lower control message transmission frequency than is defined by the communication protocol in use); and an in-use period in which the control message transmission frequency is defined by the communication protocol in use by the mobile terminal.

Advantageously, the various embodiments described above make it possible to save bandwidth, by taking up fewer of the frequency resources required for sending control messages.

Advantageously, the embodiments just described make it possible not to overload the communications network with control messages. Additionally, on the communications network side, it is more useful to regularly interact with (in particular to locate) a mobile terminal in an in-use period (in particular when moving) than to interact with a mobile terminal in an idle period (fixed in relation to the network infrastructure, and therefore its location is unchanged in the communications network paging cache).

Advantageously, the method just described makes it possible to reduce the harmful effect of the electromagnetic waves transmitted by the mobile terminal on the human body; and reduce interference problems with other electronic circuits.

The invention claimed is:

1. A method for saving energy in a mobile terminal, comprising the steps of:

sending control messages with a first transmission frequency during a first period called an in-use period of the mobile terminal; and sending control messages with a second transmission frequency during a second period called an idle period of the mobile terminal;

wherein a transition from the idle period to the in-use period, or vice versa, is dependent upon a movement of the mobile terminal, a time-out, and calls received during the idle period being summarized by the terminal as soon as the mobile terminal switches to the in-use period and then reported to the user.

2. The method according to claim 1, further comprising the step of obtaining the transition from the idle period to the in-use period as soon as the movement of the mobile terminal is detected during a predefined idle period time-out.

3. The method according to claim 1, further comprising the step of obtaining the transition from the in-use period to the idle period as soon as the mobile terminal is not in communication and no movement of the mobile terminal is detected during a predefined in-use period time-out.

4. The method according to claim 1, further comprising the step of specifying a first control message transmission frequency by the communication protocol in use by the mobile terminal.

5. The method according to claim 4, wherein a second control message transmission frequency is lower than the first control message transmission frequency.

6. The method according to claim 5, wherein the second control message transmission frequency is null, being obtained by turning off a radio interface of the mobile terminal.

7. The method according to claim 5, further comprising the steps of:
- notifying a communications network to which the mobile terminal is connected of the usage of a new control message transmission frequency different from the one in use; and
- changing the control message transmission frequency in use by the mobile terminal.

8. A mobile terminal comprising:
- a motion sensor configured to detect movement of the mobile terminal;
- a timer; and
- a logic unit configured to
  - use information transmitted from the motion sensor and a time from the timer;
  - select, as a consequence, a control message transmission frequency that is different from a first control message transmission frequency that is currently in use; and
  - summarize, by the terminal upon switching to an in-use period, calls received on the mobile terminal during an idle period and then reported to the user.

9. The mobile terminal of claim 8, further comprising a radio interface, wherein the selected control message transmission frequency is null, obtained by turning off the radio interface.

10. The mobile terminal of claim 8, wherein the selected control message transmission frequency is specified by a communication protocol in use by the mobile terminal.

11. A non-transitory computer-readable medium having computer executable instructions for performing steps, comprising:
- sending control messages with a first transmission frequency during a first period called an in-use period of the mobile terminal; and
- sending control messages with a second transmission frequency during a second period called an idle period of the mobile terminal;
- wherein a transition from the idle period to the in-use period, or vice versa, is dependent upon a movement of the mobile terminal, a time-out, and calls received during the idle period being summarized by the terminal as soon as the mobile terminal switches to the in-use period and then reported to the user.

* * * * *